(12) United States Patent
Honjo (10) Patent No.: US 11,089,209 B2
(45) Date of Patent: Aug. 10, 2021

(54) IMAGE CAPTURE DEVICE, SYSTEM, METHOD FOR CONTROLLING IMAGE CAPTURE DEVICE, AND NON-TRANSITORY COMPUTER-READABLE STORAGE MEDIUM

(71) Applicant: CANON KABUSHIKI KAISHA, Tokyo (JP)

(72) Inventor: Wataru Honjo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/030,415

(22) Filed: Sep. 24, 2020

(65) Prior Publication Data
US 2021/0092289 A1    Mar. 25, 2021

(30) Foreign Application Priority Data

Sep. 25, 2019    (JP) .............................. JP2019-174540

(51) Int. Cl.
*H04N 5/232*    (2006.01)

(52) U.S. Cl.
CPC ..... *H04N 5/23225* (2013.01); *H04N 5/23206* (2013.01); *H04N 5/23296* (2013.01); *H04N 5/23299* (2018.08)

(58) Field of Classification Search
CPC ............... H04N 5/232; H04N 5/23225; H04N 5/23206; H04N 5/23296; H04N 5/23299; H04N 5/232933; H04N 5/23203; H04N 5/2259; H04N 5/44504; H04N 5/232945; H04N 5/23216; H04N 5/23293; H04N 5/772; H04N 5/232935; H04N 5/23238; H04N 7/18; H04N 7/183; H04N 7/185; H04N 21/4318; H04N 21/4312;
(Continued)

(56) References Cited

U.S. PATENT DOCUMENTS 5,838,368 A * 11/1998 Masunaga .......... H04N 5/23203
                                                            348/211.9
6,744,461 B1    6/2004 Wada et al.
(Continued)

FOREIGN PATENT DOCUMENTS

JP    2001-069494 A    3/2001

OTHER PUBLICATIONS

ONVIF Specification Map, Version 2.2.1 2011-2012, pp. 1-2.
(Continued)

*Primary Examiner* — Pritham D Prabhakher
(74) *Attorney, Agent, or Firm* — Venable LLP (57) ABSTRACT

An image capture device comprising, an image capture unit, an image-capture control unit controlling PTZ, a storage unit storing setting information including a set value of the PTZ for capturing a predetermined region, and region information specifying a detection region for an object, a reception unit receiving, from an information processing device, an editing instruction to edit the region information including information designating the setting information, a determination unit determining whether or not the set value of the PTZ in first setting information matches a current set value of the PTZ, and a processing unit updating the set value of the PTZ in the first setting information with the current set value of the PTZ if the set value of the PTZ does not match the current set value of the PTZ.

13 Claims, 8 Drawing Sheets

(58) Field of Classification Search
CPC ........... H04N 21/2187; H04N 21/8453; H04N 21/45455; H04N 21/234345; H04N 21/4751; H04N 21/4542; H04N 21/4223; H04N 9/8042; G08B 13/19686; H04L 65/60; H04L 63/105; G03B 21/26; G09G 5/34; G09G 2358/00; G09G 2340/045
USPC ...................................................... 348/231.6
See application file for complete search history.

(56) References Cited

U.S. PATENT DOCUMENTS

| | | | | |
|---|---|---|---|---|
| 7,961,953 | B2* | 6/2011 | Itoh | G08B 13/19643 |
| | | | | 382/209 |
| 10,638,050 | B2* | 4/2020 | Lee | H04N 5/2628 |
| 10,848,685 | B2* | 11/2020 | Yokomizo | G08B 13/19643 |
| 2004/0056964 | A1* | 3/2004 | Kawai | H04N 5/23206 |
| | | | | 348/211.1 |
| 2005/0046699 | A1* | 3/2005 | Oya | G08B 13/19691 |
| | | | | 348/207.1 |
| 2006/0104625 | A1* | 5/2006 | Oya | H04N 5/23299 |
| | | | | 396/153 |
| 2007/0058046 | A1 | 3/2007 | Kagei | |
| 2008/0239092 | A1 | 10/2008 | Sugino et al. | |
| 2008/0317356 | A1* | 12/2008 | Itoh | G08B 13/19643 |
| | | | | 382/209 |
| 2009/0058878 | A1 | 3/2009 | Sasagawa | |
| 2009/0175501 | A1* | 7/2009 | Tahara | H04N 7/15 |
| | | | | 382/103 |
| 2011/0025854 | A1 | 2/2011 | Yoshizumi | |
| 2011/0235925 | A1* | 9/2011 | Itoh | G08B 13/19643 |
| | | | | 382/218 |
| 2012/0098854 | A1 | 4/2012 | Ohnishi | |
| 2014/0074977 | A1 | 3/2014 | Niida | |
| 2014/0118545 | A1 | 5/2014 | Iwasaki | |
| 2014/0198210 | A1* | 7/2014 | Lee | H04N 7/183 |
| | | | | 348/143 |
| 2017/0041530 | A1* | 2/2017 | Kimura | H04N 5/23299 |
| 2017/0041608 | A1* | 2/2017 | Yokomizo | H04N 19/124 |
| 2017/0302860 | A1* | 10/2017 | Yokomizo | H04N 5/232 |
| 2017/0345162 | A1 | 11/2017 | Bamba | |
| 2018/0227499 | A1* | 8/2018 | Lee | H04N 5/23299 |
| 2018/0376078 | A1* | 12/2018 | Adachi | H04N 5/2228 |
| 2019/0052814 | A1 | 2/2019 | Yonishi | |
| 2019/0149744 | A1* | 5/2019 | Fukunaga | H04N 5/247 |
| | | | | 348/207.1 |
| 2020/0014854 | A1* | 1/2020 | Katsunuma | H04N 5/247 |
| 2020/0014856 | A1* | 1/2020 | Asanuma | G06T 1/0014 |
| 2020/0059595 | A1* | 2/2020 | Ono | H04N 5/23219 |

OTHER PUBLICATIONS

ONVIF Analytics Service Specification, Version 19.06, Jun. 2019, pp. 1-57.
ONVIF PTZ Service Specification, Version 18.12, Dec. 2018, pp. 1-50.

* cited by examiner

DETECTION RULE SETTINGS 400

| DETECTION RULE NAME | DETECTION REGION (ASSIGN AS POLYGON IN SCREEN COORDINATE) | PTZ PRESET NAME | DETECTION REGION (SPATIAL COORDINATES) |
|---|---|---|---|
| RULE 1 | (x=-1.0,y=1.0), (x=-1.0,y=-1.0), (x=1.0,y=-1.0), (x=1.0,y=1.0) | token1 | Sc1 |
| RULE 2 | (x=-0.5,y=0.5), (x=-0.5,y=-0.5), (x=0.5,y=-0.5), (x=0.5,y=0.5) | token2 | Sc2 |
| RULE 3 | (x=-0.5,y=0.5), (x=-0.5,y=-0.5), (x=0.5,y=-0.5), (x=0.5,y=0.5) | token1 | Sc1 |

FIG. 4B

PTZ PRESET SETTINGS 410

| PRESET NAME | PTZ VALUE | DETECTION RULE | CREATOR |
|---|---|---|---|
| token1 | (p=p1), (t=t1), (z=z1) | RULE 1, RULE 3 | USER |
| token2 | (p=p2), (t=t2), (z=z2) | RULE 2 | MONITORING CAMERA |
| token3 | (p=p3), (t=t3), (z=z3) | | USER |

IMAGE CAPTURE DEVICE, SYSTEM, METHOD FOR CONTROLLING IMAGE CAPTURE DEVICE, AND NON-TRANSITORY COMPUTER-READABLE STORAGE MEDIUM

BACKGROUND OF THE INVENTION

Field of the Invention

The present disclosure relates to an image capture device, a system, a method for controlling an image capture device, and a non-transitory computer-readable storage medium.

Description of the Related Art

A monitoring camera with a pan-tilt-zoom (PTZ) mechanism is provided with a function of registering a PTZ position as a preset in accordance with an instruction from a user, and moving to the PTZ position registered as a PTZ preset in accordance with an instruction. Also, the monitoring camera is provided with a function of, for example, detecting an object in a captured image. The user can operate a user interface (UI) on a screen that displays an image received by an information processing device from the monitoring camera, and set a detection region that indicates a region to perform detection in the screen, and detection rules including a detection rule name or the like.

Patent Document 1 discloses a technology by which, when a region of a mask for privacy protection is set in an image captured by a monitoring camera, a mask region and a PTZ position that are designated with screen coordinates are transmitted to the monitoring camera, and the monitoring camera deals with the mask region as spatial coordinates based on the mask region and the PTZ position.

Also, in a monitoring camera that distributes a captured image to a client device, a command group is implemented to give instructions to change settings of the monitoring camera from an external device, create and edit a preset, and create, edit, and delete settings of detection rules including designation of a detection region. As an example of such a command group, one that is defined by a standard provided by Open Network Video Interface Forum (hereinafter referred to as ONVIF) in the ONVIF Specification (http://www.onvif.org/specs/DocMap.html) is known.

It is conceivable that the technology disclosed in Japanese Patent Laid-Open No. 2001-69494 is applied, and when a detection rule is created or edited, a detection region that is designated with coordinates in the screen to detect an object is associated with a PTZ preset that includes a PTZ value, and the detection region is dealt with as spatial coordinates.

In this case, if the current PTZ value for capturing an image when setting a detection region in a captured image displayed on a UI screen differs from the PTZ value of a PTZ preset designated by detection rule settings, a problem arises in that the detection region is set at a position different from the position that is set on the UI screen.

SUMMARY OF THE INVENTION

A technology is provided that enables a detection region to be set at a position that is set by a user even if a PTZ value of a captured image when the detection region is set differs from a PTZ value of a PTZ preset designated by detection rule settings.

One aspect of exemplary embodiments relates to an image capture device comprising, an image capture unit, an image-capture control unit configured to control pan, tilt, and zoom (PTZ) when an image is captured by the image capture unit, a storage unit configured to store setting information including a set value of the PTZ for capturing an image of a predetermined region in an image-capture area of the image capture unit, and region information that specifies a detection region for detecting an object in a captured image, a reception unit configured to receive, from an information processing device, an editing instruction to edit the region information including information that designates the setting information, a determination unit configured to determine whether or not the set value of the PTZ in first setting information designated by the information that designates the setting information included in the editing instruction received by the reception unit matches a current set value of the PTZ of the image capture unit, and a processing unit configured to update the set value of the PTZ in the first setting information with the current set value of the PTZ if the set value of the PTZ in the first setting information does not match the current set value of the PTZ.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached draw-

First Embodiment

A first embodiment of the invention will be described below.

Figure 1:
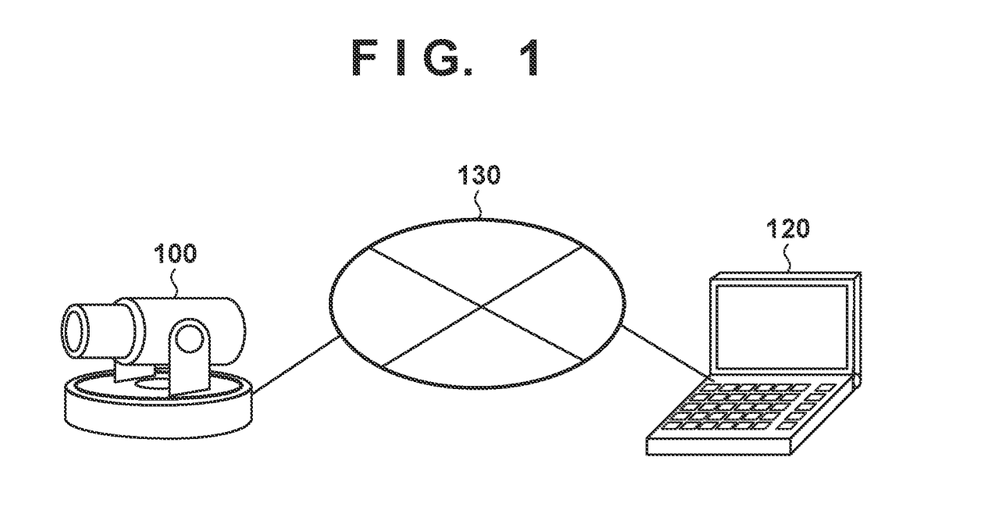
FIG. 1 shows an example of a system configuration including a configuration of a monitoring camera according to an embodiment.

Firstly, a system configuration according to the present embodiment will be described with reference to FIG. 1. FIG. 1 is a diagram showing an example of a system configuration including a monitoring camera 100. The monitoring camera 100 and a client device 120 are communicably connected to each other via a network 130. The client device 120, serving as an external device, transmits, to the monitoring camera 100, control commands such as commands to give instructions of create, edit, and delete a PTZ preset, and commands to give instructions to create, edit, and delete a detection rule in object detection. The monitoring camera 100 creates, edits, and deletes a PTZ preset, and also creates, edits, and deletes a detection rule in accordance with the commands, and transmits responses to the commands to the client device 120.

The monitoring camera 100 is, for example, an image capture device that is installed in a monitoring target area, such as a convenience store, an apartment, an airport, a station building, a theater, a movie theater, or a stadium. The monitoring camera 100 can also be called a network camera, an image generation device, and an image communication device, or the like. The monitoring camera 100 is installed to capture an image of a predetermined region (monitoring region) in the monitoring target area, and has a function of distributing a captured image (moving image, still image) to the client device 120 via the network 130. The monitoring camera 100 has a PTZ (pan-tilt-zoom) control function, and may also have a platform (not shown) for control the pan and tilt. A configuration may also be employed in which a plurality of monitoring cameras 100 are prepared and separately installed to capture images of a plurality of monitoring regions in the monitoring target area.

The client device 120 is an information processing device that communicates with the monitoring camera 100 via the network 130 and controls operations of the monitoring camera 100. Alternatively, the client device 120 can also be called a camera control device, an image communication device, an image processing device, or the like. For example, the client device 120 can control the platform and make a request to change image quality settings, PTZ control, or the like. Also, the client device 120 transmits control commands such as the aforementioned PTZ preset command and detection rule command to the monitoring camera 100. The client device 120 receives, via the network 130, moving images and still images captured by the monitoring camera 100. The client device 120 can also function as an image analysis device (image processing device, image analysis device) that analyzes images captured by the monitoring camera 100, and can perform processing to, for example, detect and determine a person who is present in the monitoring region, and to count the number of people who have passed through a specific region (area or position) in the monitoring region. The client device 120 can be realized as an information processing device; for example, a personal computer, a server, a smartphone, a tablet, or the like. The client device 120 is not limited to being realized by a single device, and the functions thereof may be realized by a plurality of devices cooperating with each other.

Figure 2A:
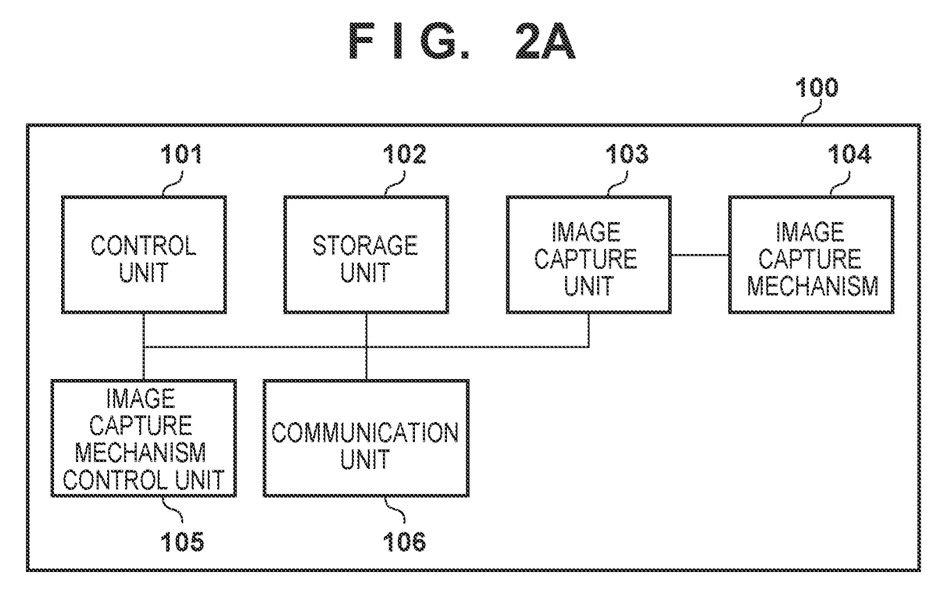
FIG. 2A shows an example of a functional configuration of a monitoring camera 100 according to an embodiment.

Next, an example of a functional configuration of the monitoring camera 100 will be described with reference to FIG. 2A. In FIG. 2A, a control unit 101 is constituted by a CPU, for example, and controls the entire monitoring camera 100. A storage unit 102 is mainly used as an area for storing various data, such as an area for storing programs to be executed by the control unit 101, a work area when a program is being executed, a set value storage area for settings of PTZ presets, detection rules, or the like, and an area for storing image data generated by a later-described image capture unit 103.

The image capture unit 103 converts, to digital data, an analog signal that is acquired by capturing an image of an object formed by an imaging optical system of the monitoring camera 100, and performs development processing on the digital data. Then, the image capture unit 103 generates image data by performing compression and encoding processing based on a format such as JPEG, H.264, or H.265, and outputs the generated image data to the storage unit 102. If a detection region for detecting an object is set for a captured image, the image capture unit 103 can output an image of the detection region of the captured image. Captured images may include a moving image and a still image. Upon a captured image being output to the storage unit 102, the control unit 101 receives an image acquisition event from the image capture unit 103.

An image capture mechanism 104 is constituted by an imaging optical system, which includes a lens, an image sensor, and so on, and a pan-tilt-zoom mechanism that controls the image capturing direction and the angle of view. An image capture mechanism control unit 105 controls the platform for controlling the pan and tilt of the image capture mechanism 104 and controls zoom magnification in the imaging optical system in accordance with a value of the pan, tilt, or zoom that is input by the control unit 101, and performs control so as to capture an image of a desired region in the monitoring region. After controlling the pan-tilt-zoom mechanism, the image capture mechanism control unit 105 outputs, to the storage unit 102, the values of the position, area, and so on, of an image-capture region that are changed through control. A communication unit 106 is used to receive commands to change and control set values from external devices, and transmit responses to the commands and images (image data stored in the storage unit 102) to the external devices. If a command is received from an external device, the control unit 101 receives a command receipt event from the communication unit 106.

FIG. 2A shows an example of a functional configuration of the monitoring camera 100, but the functional configuration of the monitoring camera 100 is not limited thereto. Various modifications and changes may be made within the scope of the invention. For example, an audio input unit and an audio output unit may also be provided.

Figure 2B:
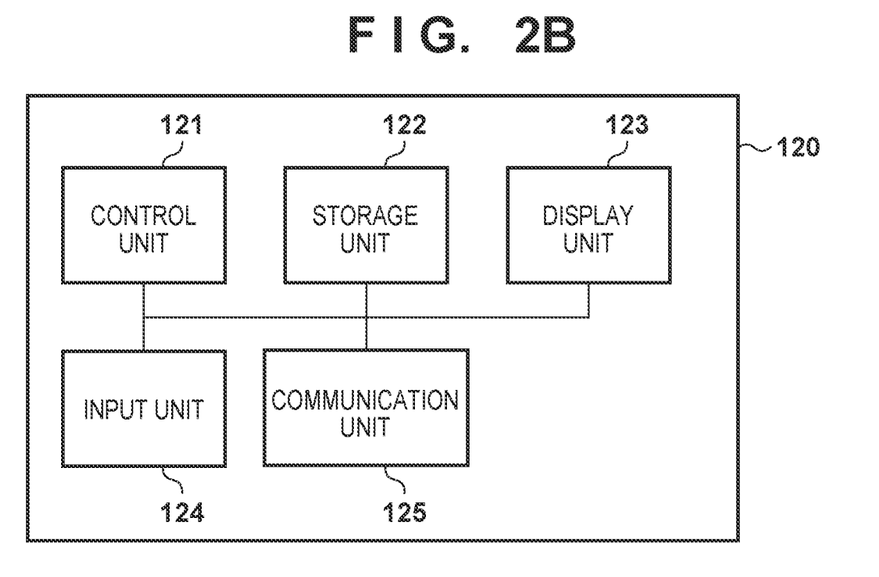
FIG. 2B shows an example of a functional configuration of a client device 120 according to an embodiment.

Next, an example of a functional configuration of the client device 120 will be described with reference to FIG. 2B. In FIG. 2B, a control unit 121 is constituted by a CPU, for example, and controls the entire client device 120. The control unit 121 also decodes compressed and encoded image data received from the monitoring camera 100 based on a format such as JPEG, H.264, or H.265, and extracts the image data in the storage unit 122.

A storage unit 122 is mainly used as an area for storing various data, such as an area for storing programs to be executed by the control unit 121, and a work area when a program is being executed. A display unit 123 is constituted by, for example, an LCD, an organic EL display, or the like, and displays, to a user of the client device 120, a viewer screen for images (moving images, still images) received from the monitoring camera 100, a PTZ preset setting screen, a detection rule setting screen, various messages, and so on.

An input unit 124 is constituted by, for example, buttons, a keyboard, a touch panel, a mouse, or the like, and notifies the control unit 121 of the content of a screen operation performed by the user. The communication unit 125 is used when control commands, such as commands to make requests to create, edit, acquire, and delete a PTZ preset, and commands to create, edit, delete, and acquire a detection rule for object detection are transmitted to the monitoring camera 100, and when responses to control commands and images are received from the monitoring camera 100.

FIG. 2B shows an example of a functional configuration of the client device 120, but the functional configuration of the client device 120 is not limited thereto. Various modifications and changes may be made within the scope of the embodiment. For example, an image analysis processing unit and an image accumulation unit may also be provided.

Next, an example of a hardware configuration of the monitoring camera 100 will be described with reference to FIG. 2C. A CPU 111 is a device that comprehensively controls the monitoring camera 100 and computes and processes data, and can function as the control unit 101. The CPU 111 compresses and encodes a digital image signal output from a camera unit 116 and generates image data, and may also function as the compression/encoding unit. A RAM 112 is a volatile memory and is used as a temporary storage area such as a main memory, a work area, or the like of the CPU 111. A ROM 113 is a nonvolatile memory, and image data and other data, various programs for the CPU 111 to operate, and so on, are stored in respective predetermined areas. The CPU 111, for example, uses the RAM 112 as a work memory and controls each part of the monitoring camera 100 in accordance with a program stored in the ROM 113. Note that the programs for the CPU 111 to operate are not limited to being stored in the ROM 113, and may alternatively be stored in a storage device 114.

The storage device 114 is constituted by a magnetic disk such as an HDD or a flash memory, for example, and can function as the storage unit 102. The storage device 114 stores an application program, an OS, a control program, a related program, and so on. The storage device 114 can read and write data based on the control of the CPU 111. The storage device 114 may also be used in place of the RAM 112 and the ROM 113.

A communication device 115 is a communication interface for communication with the client device 120 via the network 130 based on the control of the CPU 111, and can function as the communication unit 106. The communication device 115 may include a wireless communication module, and this module may include any of known circuit mechanisms including an antenna system, an RF transceiver, one or more amplifiers, a tuner, one or more oscillators, a digital signal processor, a CODEC chip set, a subscriber identity module card, a memory, or the like. The communication device 115 may also include a wired communication module for wired connection. The wired communication module allows communication with other devices via one or more external ports. The communication device 115 may also include various software components for processing data. The external ports are coupled to other devices directly via the Ethernet, USB, IEEE1394, or the like, or indirectly via a network. Note that software that realizes functionalities equivalent to the above-described devices may replace hardware devices.

A camera unit 116 can function as the image capture unit 103 that includes an imaging optical system, an image sensor such as a CCD or a CMOS, a development processing unit, and so on, and the image capture mechanism 104 that is constituted by an imaging optical system, a movable platform for controlling the image capturing direction and the angle of view, and so on. The camera unit 116 captures an image of the monitoring region in the monitoring target area, which is a real space, and generates the image. The camera unit 116 converts an analog image signal obtained through photoelectric conversion using the image sensor such as a CCD or CMOS image sensor, to a digital image signal through A/D conversion. The camera unit 116 also performs development processing, such as DeBayer processing, white balance processing, and tone conversion processing, on the digital image signal, and outputs the processed signal to the CPU 111. For example, the camera unit 116 can acquire still images, and can also acquire images for a predetermined number of frames (e.g. 30 frames) per minute to acquire moving images (live video) at 30 fps of the monitoring region.

A camera control device 117 includes a movable platform for changing the image capturing direction, and an image-capture controlling mechanism for changing settings for capturing an image, such as settings of zooming, focusing, and aperture in the imaging optical system, and functions as the image capture mechanism control unit 105. An operation unit 118 is constituted by, for example, buttons, four-direction keys, a touch panel, or the like, and accepts operation input from the user.

Figure 2C:
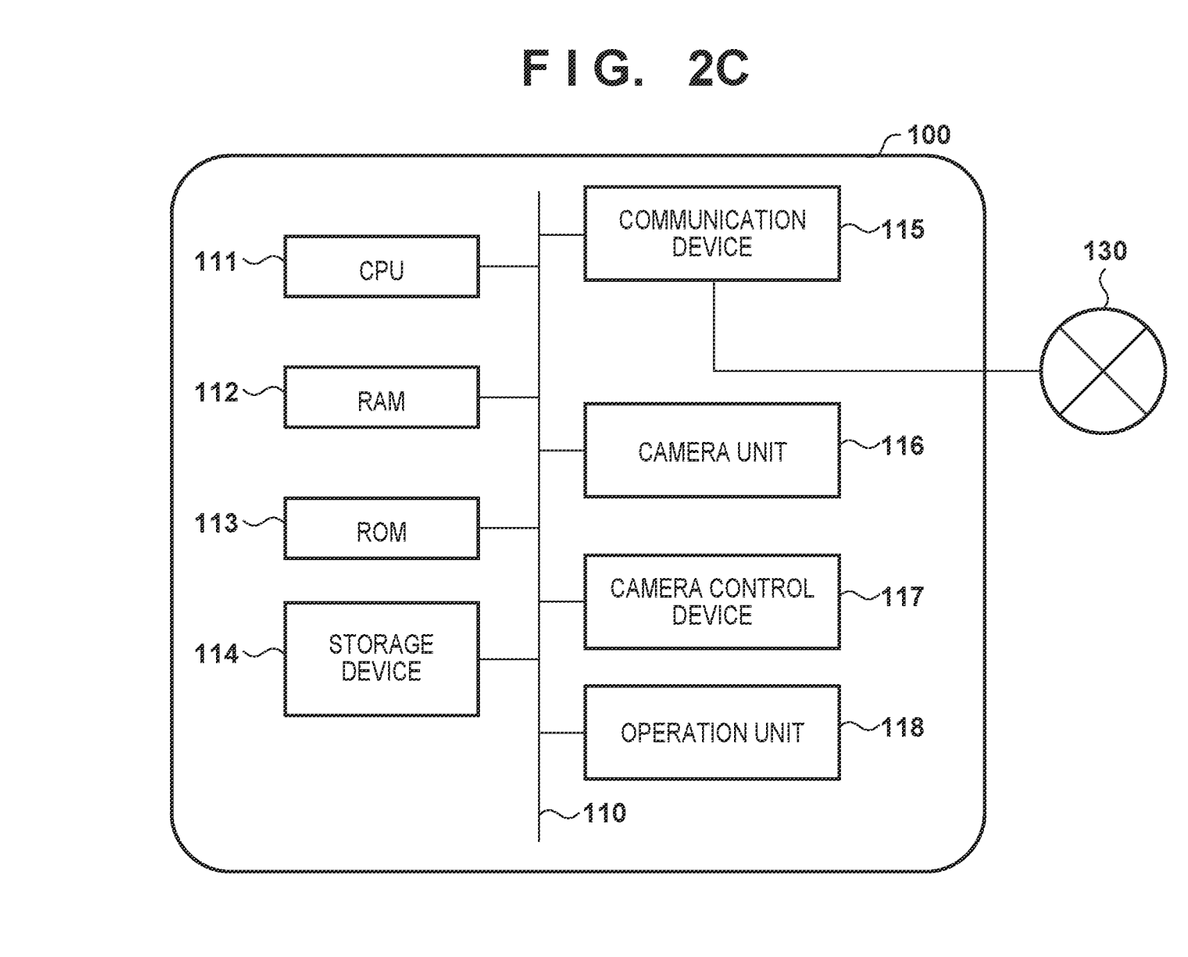
FIG. 2C shows an example of a hardware configuration of the monitoring camera 100 according to an embodiment.

Although FIG. 2C is shown as a hardware configuration diagram of the monitoring camera 100, the hardware configuration of the client device 120 may also conform to that in FIG. 2C. In this case, the camera unit 116 and the camera control device 117 are excluded from the configuration. The operation unit 118 functions as the input unit 124 and may further include a keyboard, a mouse, and so on.

Figure 3A:
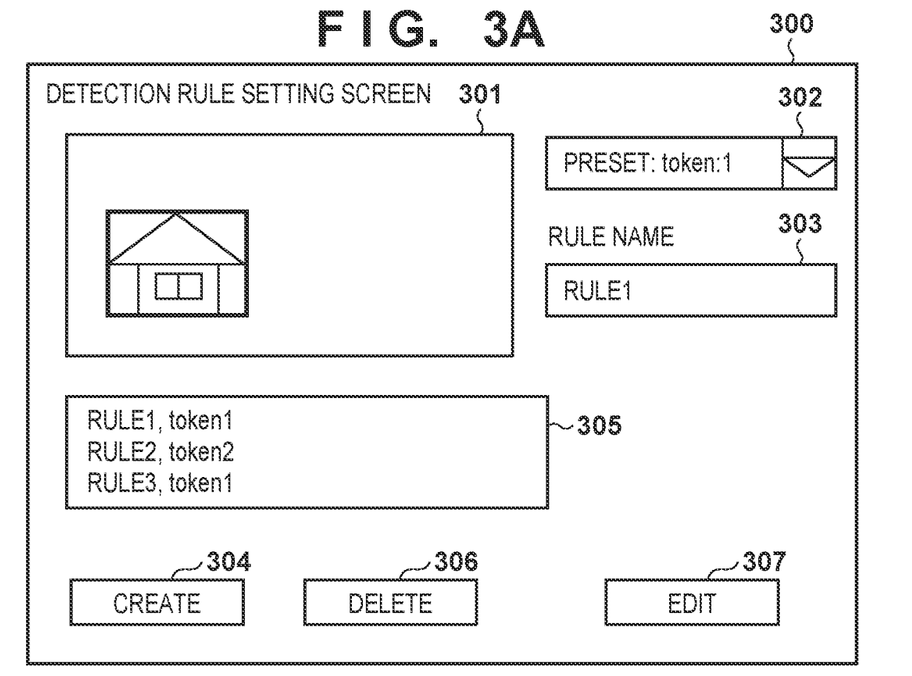
FIG. 3A shows an example of a detection rule setting screen according to an embodiment.
Figure 3B:
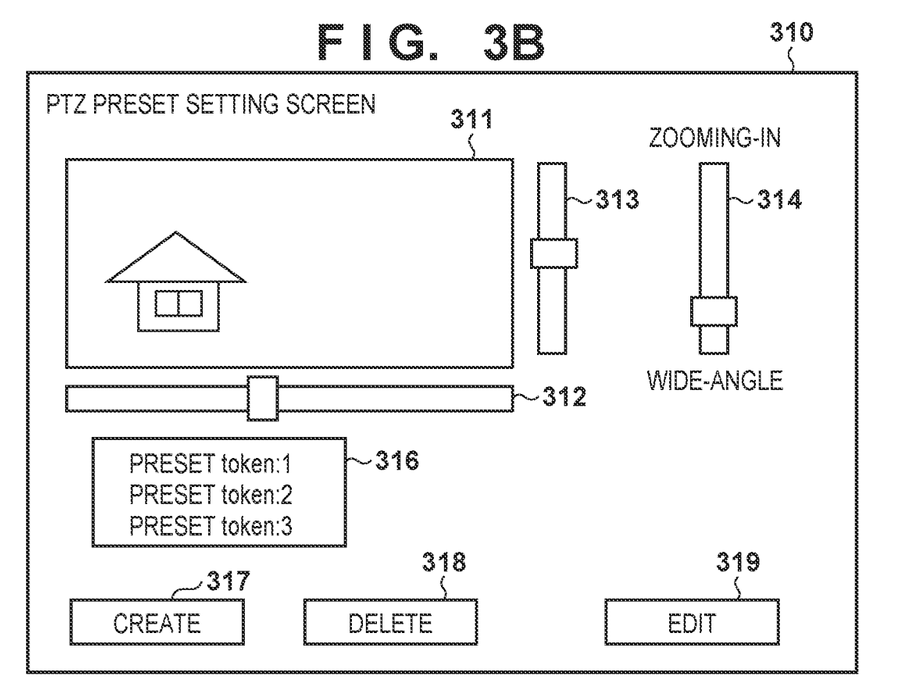
FIG. 3B shows an example of a PTZ preset setting screen according to an embodiment.

Next, a detection rule setting screen 300 and a PTZ preset setting screen 310 of on the client device 120 according to the present embodiment will be described with reference to FIGS. 3A and 3B.

First, the detection rule setting screen 300 will be described with reference to FIG. 3A. A detection region setting area 301 is a region for displaying an image received from the monitoring camera 100 and a detection region, and enables a detection region to be set in accordance with an instruction from the user. The user designates a plurality of points in the detection region setting area 301 using the input unit 124, and a polygon that connects these points is set as a detection region. The detection region is specified by the screen coordinates of the designated points. Furthermore, to set the detection region with the spatial coordinates, the user can select a PTZ preset setting in a list box 302 for selecting PTZ preset settings that are set to the monitoring camera 100, using the input unit 124. At this time, a PTZ preset setting need not be selected either.

At this time, the monitoring camera 100 holds, in the storage unit 102, the current PTZ value that is a PTZ value for capturing an image that is transmitted by the monitoring camera 100 and displayed on the detection region setting area 301.

Figure 4A:
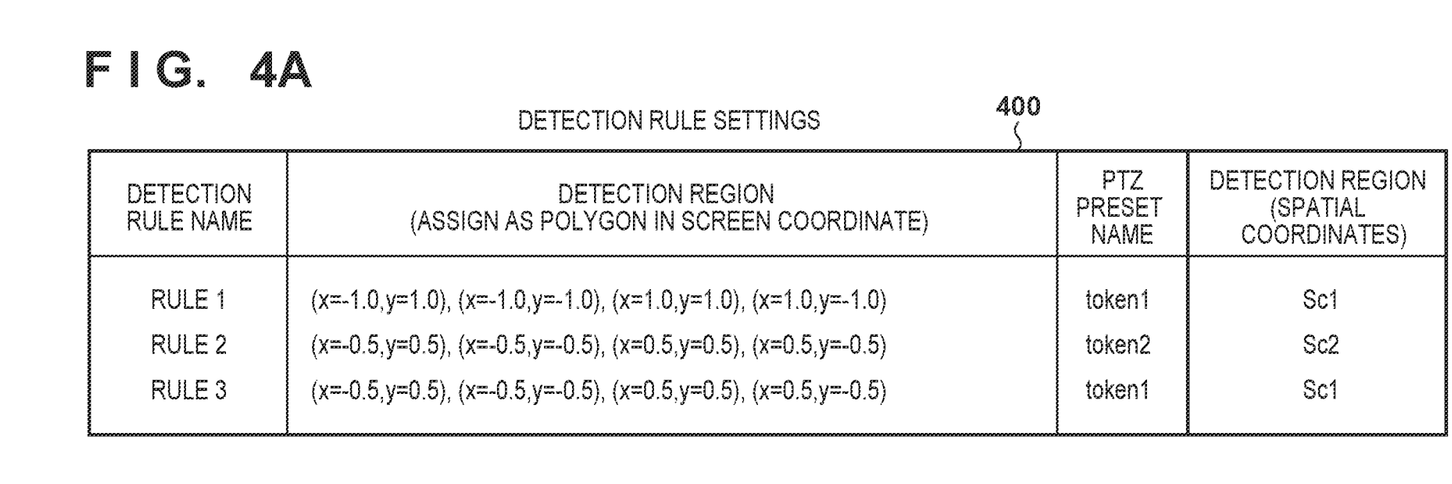
FIG. 4A is a table showing an example of detection rule settings according to an embodiment.

The user inputs a rule name to a text box 303 for inputting a rule name for identifying a detection rule, presses a create button 304, and transmits a detection rule create command from the communication unit 125 to the monitoring camera 100. Thus, a newly-generated detection rule setting is registered in a detection rule setting table 400 such as shown in FIG. 4A. Upon transmitting a detection rule acquire command from the communication unit 125 to the monitoring camera 100, the client device 120 receives set values registered in the detection rule setting table 400 as a response to the command, and displays a detection rule name in a detection rule setting list display area 305.

When a detection rule setting of the monitoring camera 100 is edited, a detection rule to be operated is selected from the detection rule setting list display area 305 on the input unit 124, the detection rule is edited by operating the detection region setting area 301, the PTZ preset selection list box 302, and rule name text box 303, then an edit button 307 is pressed, and a detection rule edit command is transmitted from the communication unit 125 to the monitoring camera 100. Thus, in the monitoring camera 100, the set value to be edited, of the detection rule settings registered in the detection rule setting table 400, is updated.

When a detection rule setting of the monitoring camera 100 is deleted, a detection rule to be operated is selected from the detection rule setting list display area 305 on the input unit 124, a delete button 306 is pressed, and a detection rule delete command is transmitted from the communication unit 125 to the monitoring camera 100. Thus, in the monitoring camera 100, the set value to be deleted, of the detection rule settings registered in the detection rule setting table 400, is deleted from the table.

Next, a PTZ preset setting screen 310 will be described with reference to FIG. 3B. A display region 311 is a region for displaying an image received from the monitoring camera 100. The user operates a pan operation bar 312, a tilt operation bar 313, and a zoom operation bar 314 on the input unit 124 while viewing the display region 311 to adjust control values of the pan, tilt, and zoom of the monitoring camera 100 and determine image-capture conditions. In the present embodiment, an image-capture area (PTZ control area) that is specified by the ranges that can be taken by the pan, tilt, and zoom values corresponds to the monitoring region that is assigned to the monitoring camera 100 in the monitoring target area. By adjusting PTZ values, the monitoring camera 100 can set image-capture conditions so as to capture an image of a desired region in the monitoring region in the image-capture area.

When a PTZ preset is created using PTZ set values that are currently displayed on the PTZ preset setting screen 310, the user presses a PTZ preset create button 317 through the input unit 124, and transmits a PTZ preset create command from the communication unit 125 to the monitoring camera 100. The PTZ preset create command can include designation of a preset name. Thus, a newly-generated PTZ preset setting is registered in a PTZ preset setting table 410 shown in FIG. 4B. Upon a PTZ preset acquire command being transmitted from the communication unit 125 to the monitoring camera 100, the client device 120 receives a set value that is registered as a response to the command in the PTZ preset setting table 410, and displays a preset name in a PTZ preset setting list display area 316.

When a PTZ preset of the monitoring camera 100 is edited, the PTZ preset to be operated is selected from the PTZ preset setting list display area 316 on the input unit 124, and the pan operation bar 312, the tilt operation bar 313, and the zoom operation bar 314 are operated to operate the PTZ of the camera to a desired position. After the PTZ operation, an edit button 319 is pressed, and a PTZ preset edit command is transmitted from the communication unit 125 to the monitoring camera 100. Thus, in the monitoring camera 100, the set value to be edited, of the PTZ preset settings registered in the PTZ preset setting table 410, is updated.

When a PTZ preset setting of the monitoring camera 100 is deleted, the PTZ preset to be operated is selected from the PTZ preset setting list display area 316 on the input unit 124, a delete button 318 is pressed, and a PTZ preset delete command is transmitted from the communication unit 125 to the monitoring camera 100. Thus, in the monitoring camera 100, the set value to be deleted, of the PTZ preset settings registered in the PTZ preset setting table 410, is deleted from the table.

Next, the detection rule settings and the preset settings in the monitoring camera 100 according to the present embodiment will be described with reference to FIGS. 4A and 4B. FIG. 4A is a table showing an example of a data structure of the detection rule settings. The detection rule setting table 400 held by the monitoring camera 100 is configured to include a detection rule name that identifies each detection rule, region information (screen coordinates) for specifying each detection region, a PTZ preset name associated with the detection rule, and region information (spatial coordinates) for specifying a detection region. The detection rule setting table 400 is stored in the storage unit 102.

The region information for specifying a detection region is coordinates for specifying an area occupied by the detection region in a screen (e.g. the detection region setting area 301 in FIG. 3A) that displays an image, or in a captured image. If the detection region has a rectangular shape, the detection region may be specified by the coordinates of four vertexes, or may be specified by the coordinates of two vertexes that diagonally oppose each other. In the case of a polygon other than a rectangle, the detection region can be specified by the coordinates of the vertexes thereof.

By combining the PTZ preset information with the detection region information, a detection region defined by screen coordinates can be converted to a detection region defined by spatial coordinates as a desired region in the monitoring region in the PTZ control area. Further, by referencing registered values of a PTZ preset, an associated PTZ preset and the presence thereof can be determined for each detection rule.

The region information for specifying a detection region is also registered as spatial coordinates. The spatial coordinates are calculated based on the screen coordinates of the detection region and the values of the pan, tilt, and zoom of a PTZ preset. Due to the spatial coordinates being held, a detection region can be set at a position designated by the user even if the values of the PTZ preset has been changed.

Figure 4B:
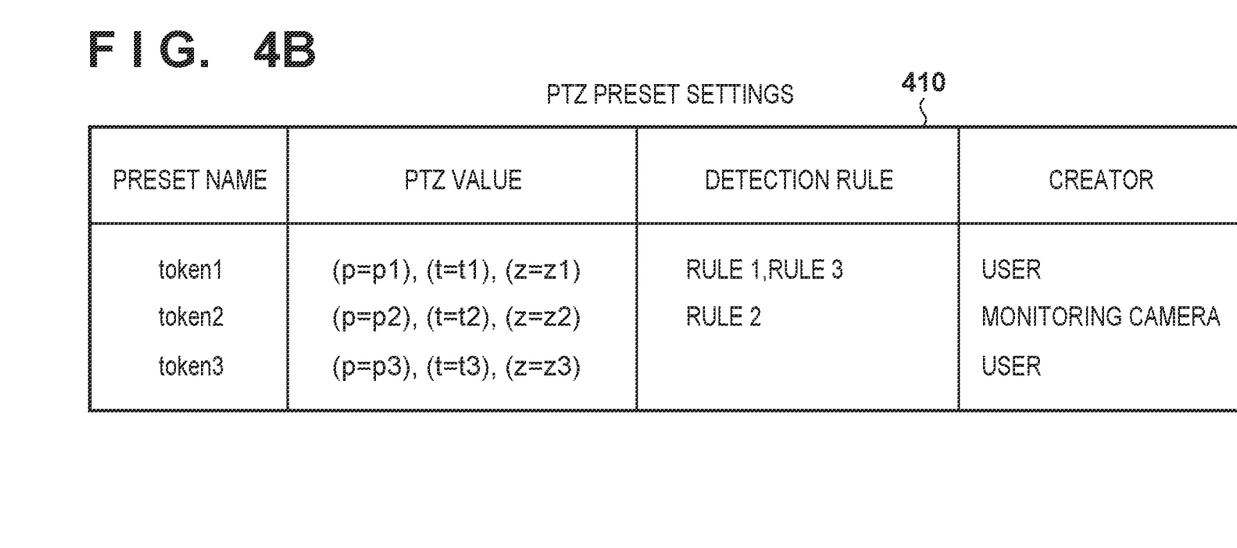
FIG. 4B is a table showing an example of PTZ preset settings according to an embodiment.

FIG. 4B is a table showing an example of a data structure of the PTZ preset settings. Setting information registered in the PTZ preset setting table 410 held by the monitoring camera 100 is configured to at least include a preset name that identifies each preset setting, PTZ set values, a detection rule name for which each PTZ preset is set, and information representing a preset creator. The PTZ preset setting table 410 is stored in the storage unit 102.

The PTZ set values are used as control values for controlling the pan, tilt and zoom in the image capture mechanism control unit 105 in order to capture an image of a desired region in the monitoring region in the PTZ control area. Since a detection rule name, which is associated with each PTZ preset setting, is registered for each detection rule, it can be determined whether or not each of the PTZ preset settings is set for a detection rule.

When a user newly creates a preset using the preset setting screen 310, this user is the preset creator. On the other hand, if the user does not designate a preset when setting a detection rule, and a preset is created on the monitoring camera 100 side, the monitoring camera is the preset creator.

Accordingly, there are two types of PTZ presets in the present embodiment; namely, a first type of PTZ preset that is generated in accordance with an instruction to create a PTZ preset, and a second type of PTZ preset that is created in accordance with an instruction to create a detection rule. The creator information may be, for example, flag information that is 0 or 1, and may be 1 when the user is the creator, and 0 when the monitoring camera 100 is the creator, or vice versa. In this case, whether or not the creator is the monitoring camera 100 can be determined by checking the flag value.

Figure 5:
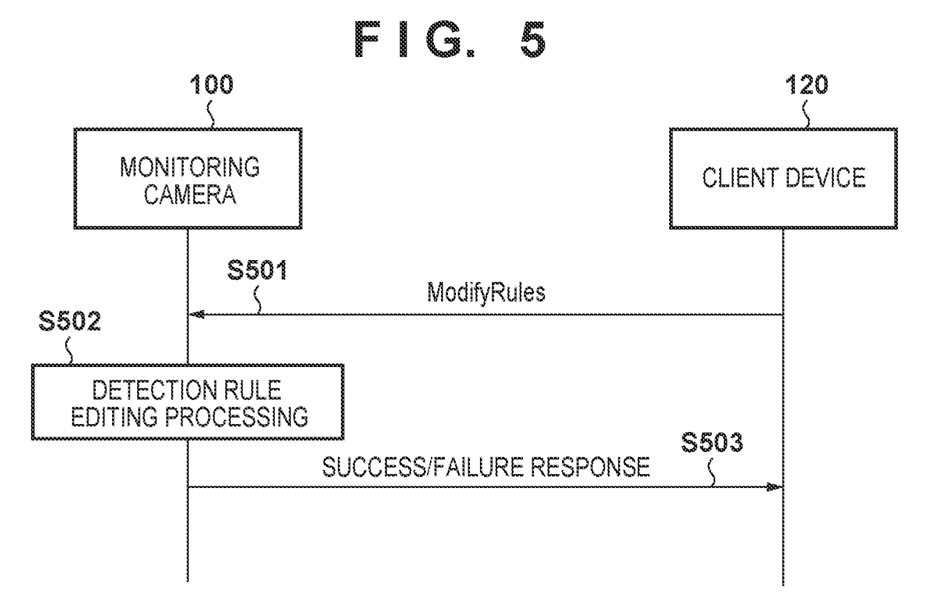
FIG. 5 is a sequence chart showing an example of communication and processing performed between the monitoring camera 100 and the client device 120 according to an embodiment.

Although the method for setting a detection rule and the method for setting a PTZ preset in the monitoring camera 100 have been described above with reference to FIGS. 3A, 3B, 4A, and 4B, the UIs and settings shown in FIGS. 4A, 4B, and 5 have been described as an example of the embodiment, and this need not be the case.

Figure 6:
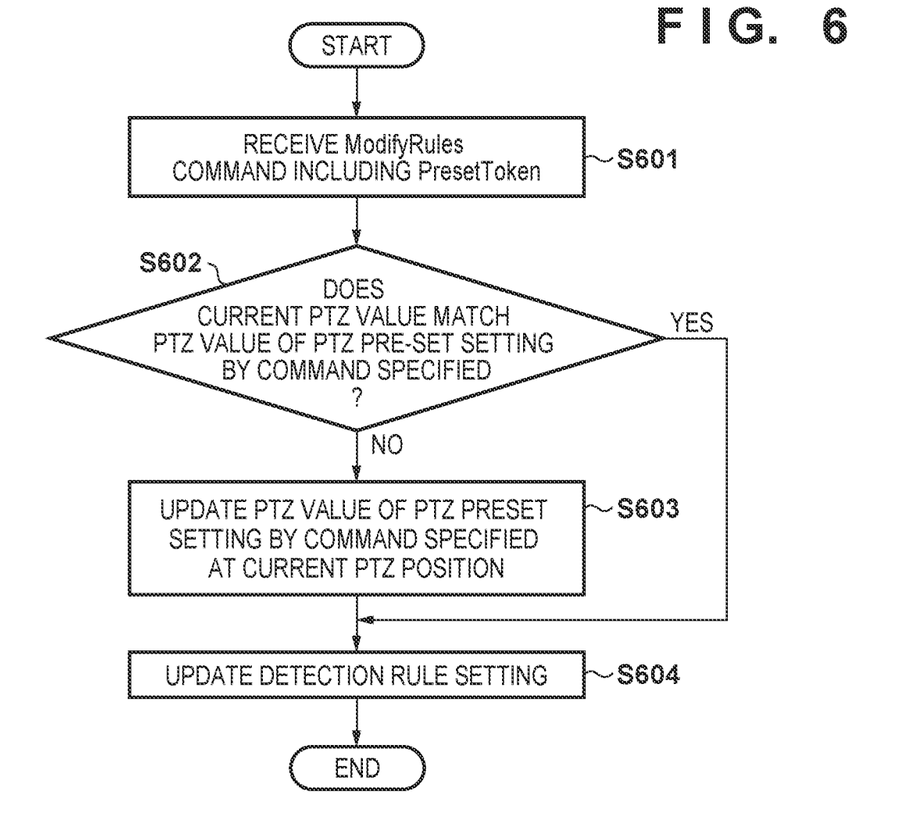
FIG. 6 is a flowchart showing an example of detection rule editing processing performed by the monitoring camera 100 according to an embodiment.

Next, an example of a method for editing a detection rule setting using an ONVIF command according to the present embodiment will be described with reference to FIGS. 5 and 6. First, a sequence using an ONVIF command will be described with reference to a sequence chart in FIG. 5. In step S501, a ModifyRules command is issued from the client device 120 to the monitoring camera 100. The ModifyRules command is a command for editing a detection rule setting (Rule) owned by the monitoring camera 100. This command is issued when the edit button 307 is pressed in the detection rule setting screen 300 in FIG. 3A.

As shown in FIG. 4A, each detection rule setting (Rule) includes, as parameters, information such as a detection rule name (Token) that identifies the Rule, a detection region (screen coordinates), and a PTZ preset name (PresetToken). As this information, values designated in the rule name text box 303, the detection region setting area 301, and the PTZ preset selection list box 302 in the detection rule setting screen 300 are set.

Upon receiving the ModifyRules command, in the following step S502, the control unit 101 of the monitoring camera 100 performs processing to edit a detection rule held in the monitoring camera 100. Specifically, for example, the control unit 101 updates a detection rule setting based on PresetToken included in the ModifyRules command and coordinate information regarding the detection region. Then, in step S503, the monitoring camera 100 transmits the result of the command to the client device 120. In FIG. 5, the protocol of these commands may be the ONVIF, but may also be an original control protocol of the monitoring camera, or the like, and is not limited to being of a specific type.

Next, the details of detection rule editing processing in step S502 in FIG. 5 will be described with reference to FIG. 6. First, in step S601, the communication unit 106 of the monitoring camera 100 receives a ModifyRules command from the client device 120. As mentioned above, the ModifyRules command is a command for editing Rule, which is a detection rule setting owned by the monitoring camera 100, and includes designation of PresetToken, for example.

In the following step S602, the control unit 101 of the monitoring camera 100 specifies, in the PTZ preset setting table 410, a PTZ preset setting that is designated by Preset-Token included in the received ModifyRules command. Then, the control unit 101 compares a PTZ value registered in this setting with the current PTZ value in the monitoring camera 100, and determines whether or not these PTZ values match. A PTZ value for capturing an image that is displayed in the detection region setting area 301 when the ModifyRules command is issued is held in the storage unit 102, and is used as the current PTZ value. At this time, if the two PTZ values match, the processing proceeds to step S604. If the values do not match, the processing proceeds to step S603.

In step S603, the control unit 101 updates, with the current PTZ value, the PTZ value of the PTZ preset setting specified by PresetToken included in the ModifyRules command received in step S601. After the update has finished, the processing proceeds to step S604.

In step S604, the control unit 101 updates the corresponding detection rule setting in the detection rule setting table 400 stored in the storage unit 102 in accordance with other parameters included in the ModifyRules command received in step S601. For example, if a new detection region is designated, the detection region is updated. Furthermore, the designated detection region is converted to spatial coordinates based on the screen coordinates of the new detection region and the PTZ value of the updated PTZ preset setting, and updates the set value of the detection region as the spatial coordinates.

As described above, in the present embodiment, if the monitoring camera 100 receives an instruction to edit (a request to update) a detection rule setting including designation of a PTZ preset setting, and the PTZ value of the designated PTZ preset setting differs from the current PTZ value of the monitoring camera 100, the PTZ value of the designated PTZ preset setting is updated with the current PTZ value, then the detection rule setting is updated, and a detection region as spatial coordinates is set.

This configuration enables a detection region to be set at a position designated on a captured image even if the PTZ value of the captured image displayed on the client device 120 differs from the PTZ value of the PTZ preset setting that is designated when a detection rule setting is edited.

Second Embodiment

Next, a second embodiment of the present invention will be described. The system configuration, the functional configuration, the hardware configuration, and so on in the present embodiment are the same as those described with reference to FIGS. 1 to 6 in the first embodiment, and a description thereof is omitted accordingly.

Figure 7:
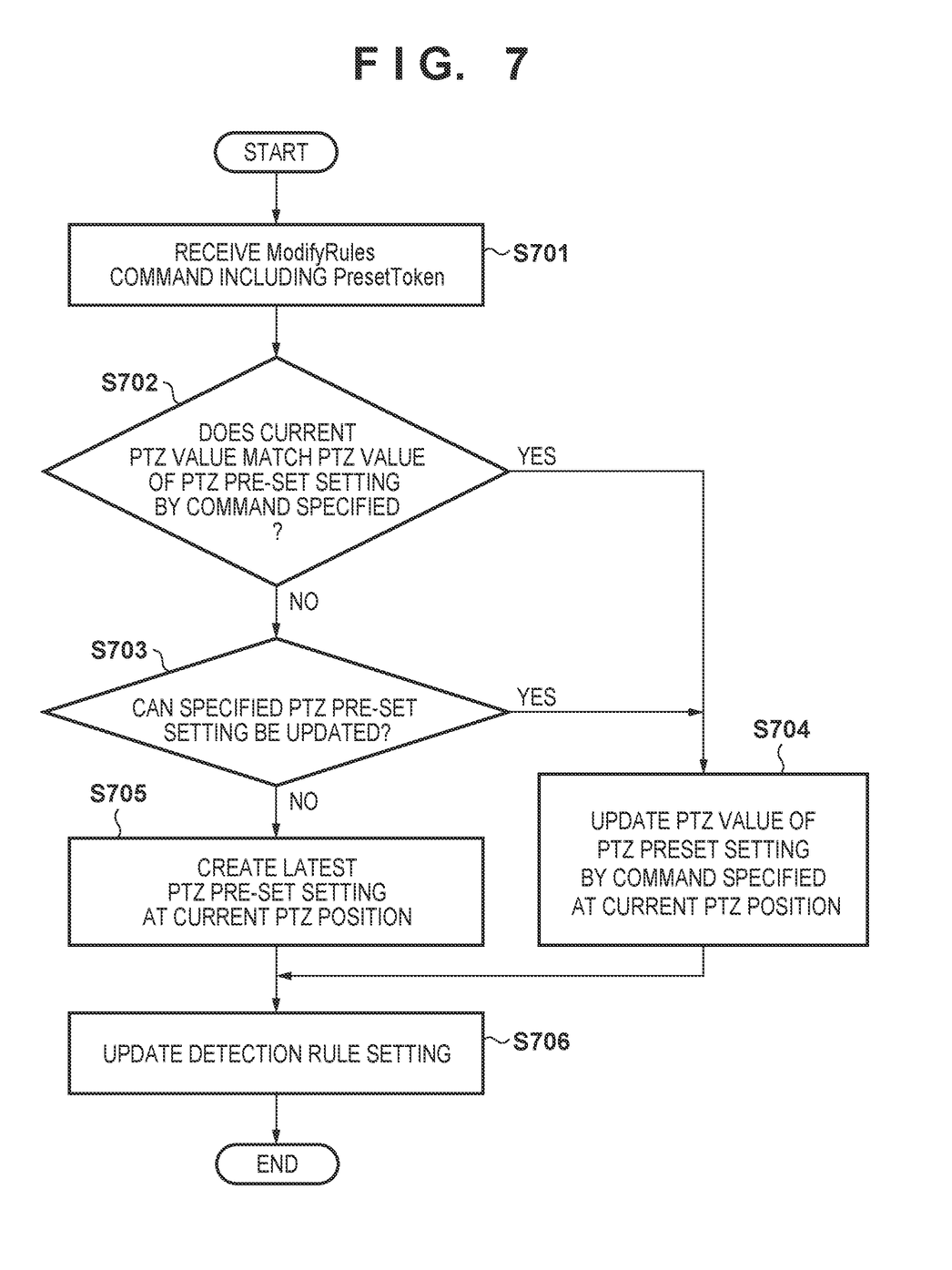
FIG. 7 is a flowchart showing another example of detection rule editing processing performed by the monitoring camera 100 according to an embodiment.

The details of the detection rule editing processing in step S502 in FIG. 5 according to the present embodiment will be described with reference to FIG. 7. First, in step S701, the communication unit 106 of the monitoring camera 100 receives a ModifyRules command from the client device 120. The ModifyRules command includes designation of PresetToken as mentioned above. In the following step S702, the control unit 101 of the monitoring camera 100 specifies, in the PTZ preset setting table 410, a PTZ preset setting that is designated by PresetToken included in the received ModifyRules command. Then, the control unit 101 compares a PTZ value registered in this setting with the current PTZ value held in the storage unit 102, and determines whether or not these PTZ values match. If it is determined that these values match, the processing proceeds to step S706. If it is determined that these values do not match, the processing proceeds to step S703.

In step S703, the control unit 101 determines whether or not the PTZ value of the PTZ preset setting designated by the received ModifyRules command can be updated. This determination can be carried out in accordance with the following criteria.

The control unit 101 references the creator of each of the PTZ preset setting, and if the creator is the monitoring camera, and the PTZ preset setting has been created on the monitoring camera side by creating or changing Rule, it is determined that the PTZ preset setting can be updated. On the other hand, if the creator is the user, it is determined that the PTZ preset setting cannot be updated. This is for not allowing a change in PTZ preset settings that are individually created using the PTZ preset setting screen in FIG. 3B by the user, for example.

Also, if a PTZ preset setting that is designated in the PTZ preset selection list box 302 and is specified by a preset name included in the ModifyRules command is associated with the detection rule setting to be edited in the detection rule setting table 400, it is determined that the PTZ preset setting can be updated. On the other hand, if the designated PTZ preset setting differs from the PTZ preset setting that is associated with the detection rule to be edited in the detection rule setting table 400, it is determined that the PTZ preset setting cannot be updated.

Furthermore, a method may be employed in which it is determined that a PTZ preset setting cannot be updated if the PTZ preset setting designated by the command is also associated with a detection rule setting other than the detection rule setting to be edited, or if the PTZ preset setting is used in any other function such as PresetTour, which is a function of capturing images while cyclically using registered PTZ values, and it is determined that the PTZ preset setting can be updated if it is not used. A cyclic image-capture function is a function in which one or more image capturing directions specified by a predetermined PTZ value are registered in advance, and images are captured while cyclically using the registered image capturing directions regularly.

In the above determination, whether or not the PTZ preset designated by the command is associated with any other detection rule setting can be determined by referencing a detection rule item for the designated PTZ preset in the PTZ preset setting table 410. A configuration may also be employed in which a flag value indicating whether or not a PTZ preset setting is used in the cyclic function or used in any other function is also registered in the PTZ preset setting table 410, and whether or not the PTZ preset setting can be updated can be determined by referencing this flag value.

If, as a result, it is determined that the PTZ preset setting can be updated, the processing proceeds to step S704, and if it is determined that the PTZ preset setting cannot be updated, the processing proceeds to step S705. In step S704, the control unit 101 updates, with the current PTZ value, the PTZ value of the PTZ preset setting specified by PresetToken included in the ModifyRules command received in step S701. After the update has finished, the processing proceeds to step S706. In step S705, the control unit 101 newly creates a PTZ preset setting using the current PTZ value stored in the storage unit 102, and updates the PTZ preset setting table 410. Any preset name that does not overlap other PTZ preset settings is automatically set, the current PTZ value is registered as the PTZ value, and a detection rule name of the detection rule to be edited is registered as the detection rule. The monitoring camera is set as the creator. Then, the processing proceeds to step S706.

In step S706, the control unit 101 updates the corresponding detection rule setting in the detection rule setting table 400 stored in the storage unit 102 in accordance with other parameters included in the ModifyRules command received in step S701. For example, if a new detection region is designated, the detection region is updated. If a new PTZ preset setting is created in step S705, the PTZ preset value is changed to the value of the new PTZ preset. Furthermore, the designated detection region is converted to spatial coordinates based on the screen coordinates of the new detection region and the PTZ value of the PTZ preset setting, and the set value of the detection region as the spatial coordinates is updated.

As described above, in the present embodiment, when the monitoring camera 100 receives a request to update a detection rule setting including designation of a PTZ preset setting, if the PTZ value of the designated PTZ preset setting differs from the current PTZ value of the monitoring camera 100, it is determined whether or not the PTZ value of the designated PTZ preset setting can be updated. If the PTZ value of the designated PTZ preset setting can be updated, the PTZ value is updated with the current PTZ value, then the detection rule setting is updated, and the detection region as spatial coordinates is set. If the PTZ value of designated PTZ preset setting cannot be updated, a PTZ preset setting is newly created and registered, the detection rule setting to be edited is updated so as to be associated with the newly-created PTZ preset setting, and a detection region as spatial coordinates is set.

Thus, if the PTZ value of the PTZ preset setting cannot be updated, a new PTZ preset setting is created and used in a detection rule setting. This configuration enables a detection region to be set at a position designated on a captured image even if the PTZ value of the captured image differs from the PTZ value of a PTZ preset setting designated when a detection rule setting is edited.

Third Embodiment

Next, a third embodiment of the invention will be described. The system configuration, the functional configuration, the hardware configuration, and so on in the present embodiment are the same as those described with reference to FIGS. 1 to 6 in the first embodiment, and a description thereof is omitted accordingly.

Figure 8:
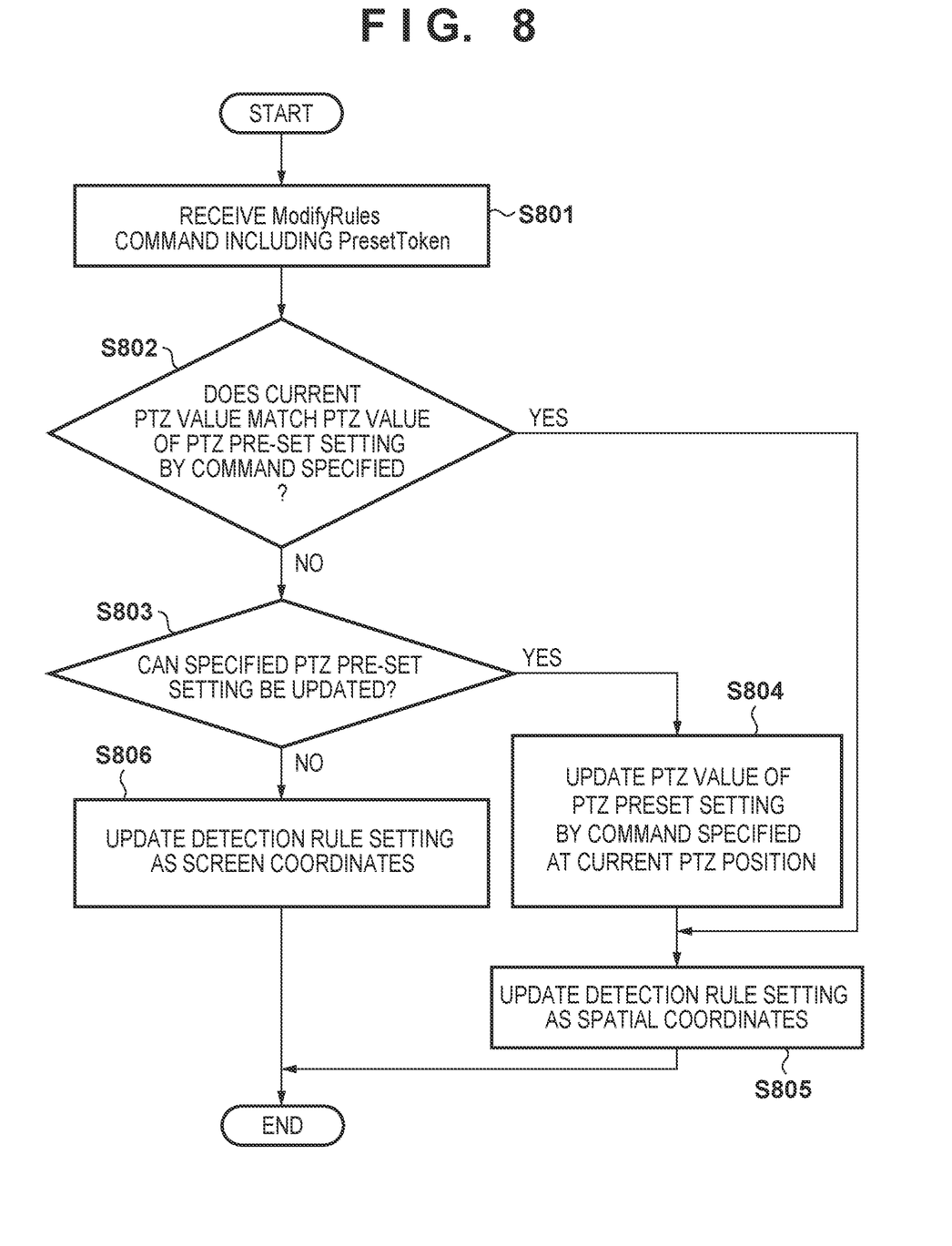
FIG. 8 is a flowchart showing yet another example of detection rule editing processing performed by the monitoring camera 100 according to an embodiment.

The details of the detection rule editing processing in step S502 in FIG. 5 according to the present embodiment will be described with reference to the flowchart in FIG. 8. In step S801, the communication unit 106 of the monitoring camera 100 receives a ModifyRules command from the client device 120. The ModifyRules command includes designation of PresetToken as mentioned above.

In the following step S802, the control unit 101 of the monitoring camera 100 specifies, in the PTZ preset setting table 410, a PTZ preset setting that is designated by PresetToken included in the received ModifyRules command. Then, the control unit 101 compares a PTZ value registered in this setting with the current PTZ value held in the storage unit 102, and determines whether or not these PTZ values match. If it is determined that these values match, the processing proceeds to step S805. If it is determined that these values do not match, the processing proceeds to step S803.

In step S803, the control unit 101 determines whether or not the PTZ value of the PTZ preset setting designated by the received ModifyRules command can be updated. This determination is the same as that described in relation to step S703 in the second embodiment, and a description thereof is omitted accordingly.

If it is determined in step S803 that the PTZ value of the PTZ preset setting can be updated, the processing proceeds to step S804. If it is determined that the PTZ value of the PTZ preset setting cannot be updated, the processing proceeds to step S806. In step S804, the control unit 101 updates, with the current PTZ value, the PTZ value of the PTZ preset setting specified by PresetToken included in the ModifyRules command received in step S801. After the update has finished, the processing proceeds to step S805. In step S805, the control unit 101 updates the corresponding detection rule setting in the detection rule setting table 400 stored in the storage unit 102 in accordance with other parameters included in the ModifyRules command received in step S801. For example, if a new detection region is designated, the detection region is updated. Also, the designated detection region is converted to spatial coordinates based on the screen coordinates of the new detection region and the PTZ value of the PTZ preset setting, and the set value of the detection region as the spatial coordinates is updated.

On the other hand, in step S806, the control unit 101 updates the corresponding detection rule setting in the detection rule setting table 400 stored in the storage unit 102 in accordance with other parameters included in the ModifyRules command received in step S701. For example, if a new detection region has been designated, the detection region as screen coordinates is updated. In addition, the original settings of the PTZ preset item are canceled and made blank, and the detection rule setting is updated without designation of a PTZ preset. Furthermore, the item of the detection region as spatial coordinates is also made blank.

As described above, in the present embodiment, when the monitoring camera 100 receives a request to update a detection rule setting including designation of a PTZ preset setting, if the PTZ value of the designated PTZ preset setting differs from the current PTZ value of the monitoring camera 100, it is determined whether or not the PTZ value of the designated PTZ preset setting can be updated. If the PTZ value of the PTZ preset setting can be updated, it is updated with the current PTZ value, then the detection rule setting is updated, and the detection region as spatial coordinates is set, similar to the second embodiment. On the other hand, if the PTZ value of the PTZ preset setting cannot be updated, PTZ preset setting information designated by the command is ignored, the detection rule setting is updated without a PTZ preset setting, and the detection region is set only with screen coordinates.

This configuration enables a detection region to be set at a position designated on a captured image by the user even if the PTZ coordinate position of a displayed captured image differs from the coordinate position of a PTZ preset that is designated when a rule is set.

Although processing for editing a detection rule setting using an ONVIF command according to the embodiments has been described above with reference to the attached drawings, the flowcharts in FIGS. 5 to 8 depict examples of preferable embodiments of internal processing of the present invention, and this need not be the case. Various modifications and changes may be made within the scope of the gist of the present invention. The invention is not limited to the above embodiments, and various modifications and changes may be made without departing from the spirit and the scope of the invention. Accordingly, claims are attached to make the scope of the invention public.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-174540, filed on Sep. 25, 2019, which is hereby incorporated by reference herein in its entirety.

What is claimed is:

1. An image capture device comprising:
    an image capture unit;
    an image-capture control unit configured to control pan, tilt, and zoom (PTZ) when an image is captured by the image capture unit;
    a storage unit configured to store setting information including a set value of the PTZ for capturing an image of a predetermined region in an image-capture area of the image capture unit, and region information that specifies a detection region for detecting an object in a captured image;
    a reception unit configured to receive, from an information processing device, an editing instruction to edit the region information including information that designates the setting information;
    a determination unit configured to determine whether or not the set value of the PTZ in first setting information designated by the information that designates the setting information included in the editing instruction received by the reception unit matches a current set value of the PTZ of the image capture unit; and
    a processing unit configured to update the set value of the PTZ in the first setting information with the current set value of the PTZ if the set value of the PTZ in the first setting information does not match the current set value of the PTZ.

2. The image capture device according to claim 1,
    wherein if the set value of the PTZ in the first setting information does not match the current set value of the PTZ, the determination unit determines whether or not the set value of the PTZ in the first setting information can be updated with the current set value of the PTZ, and the processing unit updates the set value of the PTZ in the first setting information if it is determined that the set value of the PTZ in the first setting information can be updated.

3. The image capture device according to claim 2, wherein the setting information includes:
   a first type of setting information created in accordance with an instruction to create the setting information given from the information processing device; and
   a second type of setting information created in accordance with an instruction to create the region information given from the information processing device, and
the determination unit determines that the set value of the PTZ in the first setting information can be updated if the first setting information is of the first type, and determines that the set value of the PTZ in the first setting information cannot be updated if the first setting information is of the second type.

4. The image capture device according to claim 2, wherein the determination unit determines that the set value of the PTZ in the first setting information can be updated if the first setting information is associated with the region information for which the editing instruction has been accepted in the storage unit, and determines that the set value of the PTZ in the first setting information cannot be updated if the first setting information is not associated with the region information for which the editing instruction has been accepted.

5. The image capture device according to claim 2, wherein the determination unit determines that the set value of the PTZ in the first setting information cannot be updated if the first setting information is associated with another region information different from the region information for which the editing instruction has been accepted in the storage unit, and determines that the set value of the PTZ in the first setting information can be updated if the first setting information is not associated with the other region information.

6. The image capture device according to claim 2, wherein the determination unit determines that the set value of the PTZ in the first setting information cannot be updated if the first setting information is used in cyclic image capturing to cyclically capture images in predetermined image capturing directions registered in advance, and determines that the set value of the PTZ in the first setting information can be updated if the first setting information is not used in the cyclic image capturing.

7. The image capture device according to claim 2, wherein if it is determined by the determination unit that the set value of the PTZ in the first setting information cannot be updated, the processing unit generates new setting information based on the current set value of the PTZ, and associates the newly-generated setting information with the region information for which the editing instruction has been accepted.

8. The image capture device according to claim 2, wherein if it is determined by the determination unit that the set value of the PTZ in the first setting information cannot be updated, the processing unit cancels association between the region information for which the editing instruction has been accepted and the setting information, and updates the region information with information included in the editing instruction, and the updated region information is information that designates the detection region with coordinates in the captured image.

9. The image capture device according to claim 1, wherein the processing unit updates the region information for which the editing instruction has been accepted, with information included in the editing instruction, and
the updated region information includes information that designates the detection region with coordinates in the captured image, and information that designates the detection region with spatial coordinates in the image-capture area.

10. The image capture device according to claim 1, wherein the editing instruction is based on an ONVIF command.

11. A system comprising:
   an image capture device including:
      an image capture unit;
      an image-capture control unit configured to control pan, tilt, and zoom (PTZ) when an image is captured by the image capture unit;
      a storage unit configured to store setting information including a set value of the PTZ for capturing an image of a predetermined region in an image-capture area of the image capture unit, and region information that specifies a detection region for detecting an object in a captured image;
      a reception unit configured to receive, from an information processing device, an editing instruction to edit the region information including information that designates the setting information;
      a determination unit configured to determine whether or not the set value of the PTZ in first setting information designated by the information that designates the setting information included in the editing instruction received by the reception unit matches a current set value of the PTZ of the image capture unit; and
      a processing unit configured to update the set value of the PTZ in the first setting information with the current set value of the PTZ if the set value of the PTZ in the first setting information does not match the current set value of the PTZ; and
   the information processing device that communicates with the image capture device and gives an instruction related to a setting of a detection region.

12. A method for controlling an image capture device that includes: an image capture unit; an image-capture control unit configured to control pan, tilt, and zoom (PTZ) when an image is captured by the image capture unit; and a storage unit configured to store setting information including a set value of the PTZ for capturing an image of a predetermined region in an image-capture area of the image capture unit, and region information that specifies a detection region for detecting an object in a captured image, the method comprising:
   receiving, from an information processing device, an editing instruction to edit the region information including information that designates the setting information;
   determining whether or not the set value of the PTZ in first setting information designated by the information that designates the setting information included in the received editing instruction matches a current set value of the PTZ of the image capture unit; and updating the set value of the PTZ in the first setting information with the current set value of the PTZ if the set value of the PTZ in the first setting information does not match the current set value of the PTZ.

13. A non-transitory computer-readable storage medium storing one or more programs including instructions that, when executed by a processor of an image capture device comprising: an image capture unit; an image-capture control unit configured to control pan, tilt, and zoom (PTZ) when an image is captured by the image capture unit; and a storage unit configured to store setting information including a set value of the PTZ for capturing an image of a predetermined region in an image-capture area of the image capture unit, and region information that specifies a detection region for detecting an object in a captured image, causes the processor to perform operations of:

receiving, from an information processing device, an editing instruction to edit the region information including information that designates the setting information;

determining whether or not the set value of the PTZ in first setting information designated by the information that designates the setting information included in the received editing instruction matches a current set value of the PTZ of the image capture unit; and updating the set value of the PTZ in the first setting information with the current set value of the PTZ if the set value of the PTZ in the first setting information does not match the current set value of the PTZ.

* * * * *